Aug. 2, 1966 L. LENG 3,264,587

SHORT WAVE TUNING SYSTEM

Filed Dec. 22, 1964 2 Sheets-Sheet 1

INVENTOR
Leopold Leng
BY Pierce, Scheffler & Parker
ATTORNEYS

Aug. 2, 1966 L. LENG 3,264,587

SHORT WAVE TUNING SYSTEM

Filed Dec. 22, 1964 2 Sheets-Sheet 2

INVENTOR

Leopold Leng

BY Pierce, Scheffler & Parker

ATTORNEYS

United States Patent Office 3,264,587
Patented August 2, 1966

3,264,587

SHORT WAVE TUNING SYSTEM

Leopold Leng, Wettingen, Switzerland, assignor to "Patelhold" Patentverwertungs- u. Elektro-Holding A.G., Glarus, Switzerland Filed Dec. 22, 1964, Ser. No. 420,400
Claims priority, application Switzerland, Dec. 23, 1963, 15,829/63
5 Claims. (Cl. 333—83)

This invention relates to an improved short wave tuning system capable of being tuned over a very wide range of frequencies.

Short-wave transmitters must permit a rapid frequency change in a wide frequency range of 3–30 mc., because the frequency best suitable for transmission varies with the time of day and with the distance and direction of transmission.

The greater the transmitter power and thus the size of the tubes, the more difficult is the tuning problem under the above mentioned conditions, because large tubes have great capacities between the electrodes and great stray capacities, which appear as the lower limit of the oscillary circuit capacity. The tuning inductance at maximum frequencies is thus very low. The great dimension of the tubes makes it difficult to impossible to realize the low inductance values with the usual means. The design of the oscillary circuit as a $\pi$-member and of the inductance as a stretched conductor (Lecher-line system) is no longer sufficient above a certain capacity limit.

For very high frequencies (meter- and decimeter range) shell-circuits have been used for a long time. These are also suitable for the highest frequencies of the short-wave range with high output (above 100 kw.). The disadvantage in this case is that they are not suitable for the low frequencies of the short-wave range. If reasonable dimensions are maintained, they only permit a limited frequency variation.

Suitable for the lower frequency range are variable coils which permit one to build up such circuits in a limited space in connection with additional capacities.

The invention is based upon the novel concept of combining a coil with a shell circuit in order to obtain a wide frequency range.

More particularly the invention comprises a single- or multiple thread tuning coil arranged in cylindrical shield case and of a contact ring moving in a helical path, which is provided with contacts running on the coil turns and on the shield case, and is connected with a high-power generator tube provided with an outside anode cover.

In accordance with the invention, the generator tube is arranged concentrically with the coil in such a way that the upper turns of the coil surround the anode cover and their ends are connected with the latter. In the topmost position of the contact ring, the overlying annular chamber is closed off metallically from the underlying chamber, thus forming a cavity resonator over the internal capacity of the generator tube, and in the lower positions of the contact ring, the inductance of coil turns is connected in series with the cavity resonator.

Figure 1:
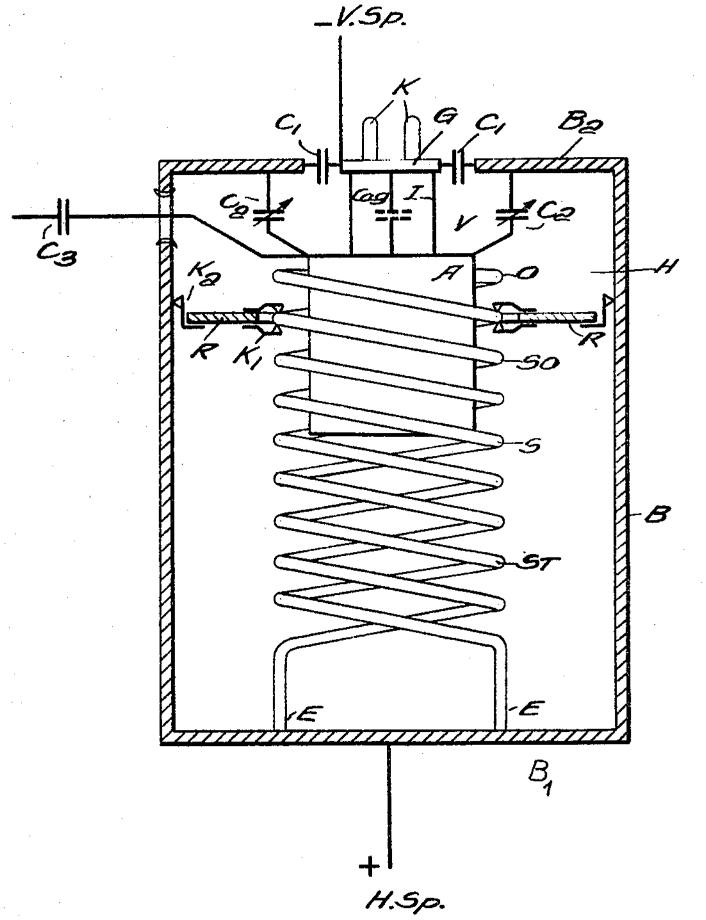
Figure 2:
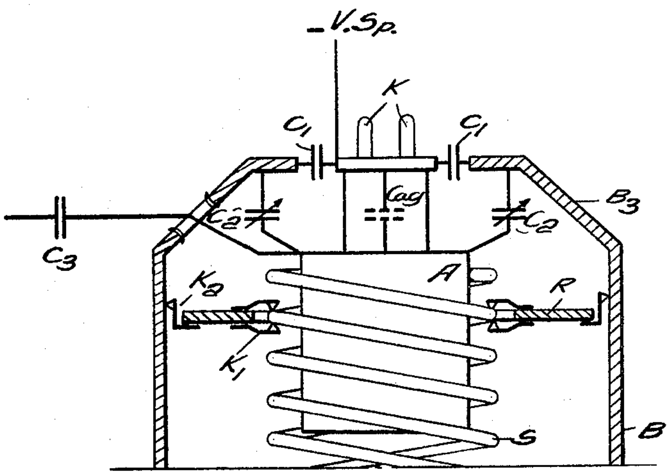
Figure 3:
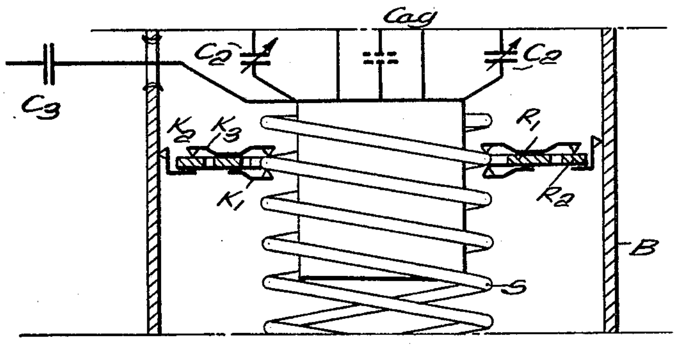

The foregoing objects and advantages of the invention will become more apparent from the following detailed description and from the accompanying drawings wherein:

FIG. 1 is a view in central vertical section of one suitable embodiment for a short wave tuning system which incorporates the invention;

FIG. 2 is a view in central vertical section of the upper part of a modified construction for the short wave tuning system wherein the upper portion of the outer casing has a truncated configuration; and FIG. 3 is a view in central section of a portion of another modification wherein the outer casing of the tuning system is jointless and both the inner and outer contacts participate in the helical movement along the turns of the tuning coil.

With reference now to FIG. 1, it will be seen that a tuning coil S of the so-called "double thread" type is located concentrically within a cylindrical tuning casing B. The coil S is connected at its lower ends E with the bottom plate B1 of the casing. Its upper ends O are connected with the outside anode cover A of the generator tube V. The tuning is effected by a contact ring R provided with contact systems K1 and K2, which run, on the one hand, on the turns of coil S and, on the other hand, on the inner surface of the shield casing B. Moreover, a high-power generator tube V is provided, this tube working, for example, in a grounded grid type circuit, and which is provided with the outer anode cover A. This cover forms at the same time the cooling vessel for cooling by air, water, or boiling to lead off the anode losses. G is the connection of the control grid, which is designed as a concentric plate in high power tubes for short-wave operation. I is the insulation between the anode and the grid.

The generator tube V is arranged concentrically in that the upper turns of the coil surround the anode cover A. The grid connecting plate G is connected capacitatively with the casing B over annularly arranged condensers $C_1$, so that the anodic high voltage is kept away from the grid. From the anode cover are also laid adjustable condensers $C_2$ against the cover plate $B_2$ of casing B. They serve to influence the tuning frequency additionally and to achieve the desired $L/C$ ratio at each frequency.

When the movable contact ring R is in its topmost position, so that the contacts $K_1$ come to lie next to the terminals O on the anode cover A, the overlying annular chamber H is closed off metallically from the underlying chamber. The upper chamber is the cavity of a cavity resonator, formed of the contact ring R, the upper part of the shield casing B and the cover plate $B_2$, as well as the inner capacity *Cag* between the anode and the grid of the generator tube. The coil S is short-circuited and inactive. The chamber under the contact ring R is practically field-free. If the position of the contact ring R has been selected lower, a part of the upper turns of the coils S is active. The inductance of these coil turns is then connected in series with the cavity resonator.

The tuning of the resonance frequency is effected by a helical movement of the contact ring R along the coil conductors. When the contact ring R is at the upper end of the coil, the system is a concentric shell circuit which is closed over the grid anode capacity of the tube and over the capacities $C_1$. The stray capacity entering into the tuning is reduced. Only that part of the surface of the anode cover A is active which is above the contact ring R. The resonance frequency is thus high.

In lower positions of contact ring R, the height of the cavity resonator is increased and at the same time turns of the coil S are connected in series; these two factors increase the effective inductance. According to the invention, the course of the inductance is thus influenced. If some of the first turns $S_0$ of the coil or possibly only a part of the first turn is connected metallically with the anode cover, there is no inductance increase through the coil turns for this part. The inductance is only increased by the greater height of the shell circuit. The following turns, which are still at the level of the tube cover, but not connected with it, have an inductance reduced by the latter, when the contact ring R is brought into a lower position, so that these turns become a part of the oscillatory circuit, the variation of the inductance is increased which is composed of the height variation of the shell circuit and of the coil inductance. In the lower part, the coil turns $S_T$ act with their full inductance, and the inductance variation is even greater. These possibilities permit an extensive adaptation to the desired regulating curve.

In order to keep the Q of the circuit sufficiently high in the entire range, the capacity $C_{ag}$ must be increased for the lower frequencies; the variable condensers $C_2$ are provided for this purpose. Instead of continually variable condensers can also be used fixed condensers, which can be added in steps.

In the embodiment according to FIG. 1, shield casing B is under high-voltage potential (+H.Sp.), while the negative bias voltage (−V.Sp.) is fed to the grid in suitable manner. Direct decoupling of power is provided in FIG. 1, since a conductor section connected with the anode extends through an opening of the shield casing B. The high voltage is blocked off by the condenser $C_3$.

The galvanic connection of the coil S with the anode cover permits the supply of cooling water over the coil conductors, which are designed as tubes. In case of steam cooling, the water is fed to the ends E and issues as steam through a steam pipe (not represented) for example, at the top. In the case of water cooling, the water can be fed through one end E and discharged through the other. Only insulation for the high voltage is required between E and the ground, because there is practically no high frequency voltage there.

FIG. 2 shows a variant where the upper end $B_3$ of casing B has the form of a truncated cone. In this way the maximum frequency can be even further increased.

The high oscillatory circuit currents flow through the contacts of the contact ring R. Multiple thread design of the coil S ensures a more uniform distribution of the current over the inner contact system $K_1$ of each thread, if the connecting points O of each thread are uniformly staggered on the anode cover A. In the case of water and steam-cooled systems, the inner contacts slide on the water-cooled tubes of the coil, so that an excellent elimination of the heat is ensured.

The outer contacts $K_2$ are distributed over the entire circumference, so that the current load of the individual contacts is low.

For constructional reasons it is sometimes desirable if the outer contacts $K_2$ participate in the helical movement. This requires that the cylindrical part of the casing be jointless. On the other hand, it must be possible to open the case to provide access to it. The variant in FIG. 3 avoids this difficulty. The contact ring R is divided into two rings $R_1$ and $R_2$. Only the inner ring $R_1$ performs the helical movement, the outer ring $R_2$ being displaced axially. The current distribution over the individual contacts of the additional contact rim is practically just as good as in the outer contacts; consequently there is no marked disadvantage here by the additional contact transfer.

I claim:

1. In a short-wave tuning system, the combination comprising a generator tube, a cylindrical anode cover concentrically surrounding the upper anode end of said tube, a helical tuning coil concentrically surrounding said generator tube and anode cover, an outer shield casing concentrically surrounding said tuning coil and which is provided with upper and lower end closure walls, an annular contact ring concentrically surrounding said tuning coil, said contact ring being provided with first contact means slidably engaging the turns of said coil for movement of said contact means and contact ring in a helical path along said coil and second contact means slidably engaging the interior surface of said outer shield casing, means electrically connecting the upper end of said coil to said anode cover and the lower end of said coil to said lower end closure wall of said outer casing, said contact ring when in its uppermost position on said coil establishing together with said outer casing and its upper end closure wall an upper annular chamber closed off metallically from a lower annular chamber established within said outer casing below said contact ring, said upper annular chamber together with the internal capacity of said generator tube forming a cavity resonator, and said contact ring when in lower positions on said coil developing by the turns on said coil above said contact ring an inductance connected in series with said cavity resonator.

2. A short-wave tuning system as defined in claim 1 wherein said tuning coil is of the double helix type.

3. A short-wave tuning system as defined in claim 1 and which includes variable condensers connected in circuit between said anode cover and said outer casing.

4. A short-wave tuning system as defined in claim 1 wherein the upper part of said outer casing above the upper end of said tuning coil has the configuration of a truncated cone.

5. A short-wave tuning system as defined in claim 1 wherein said contact ring is comprised of an inner ring to which said first contact means is secured and an outer ring to which said second contact means is secured, said inner and outer rings being electrically interconnected by other contact means and movable independently of one another such that said inner ring and first contact means perform a helical movement along said coil while said outer ring and second contact means perform a strictly axial movement along the interior surface of said outer casing.

No references cited.

ELI LIEBERMAN, *Acting Primary Examiner.*

L. ALLAHUT, *Assistant Examiner.*